Aug. 15, 1944.   H. A. MYERS   2,355,744
BRUSH MANUFACTURE
Filed May 7, 1942   2 Sheets-Sheet 1
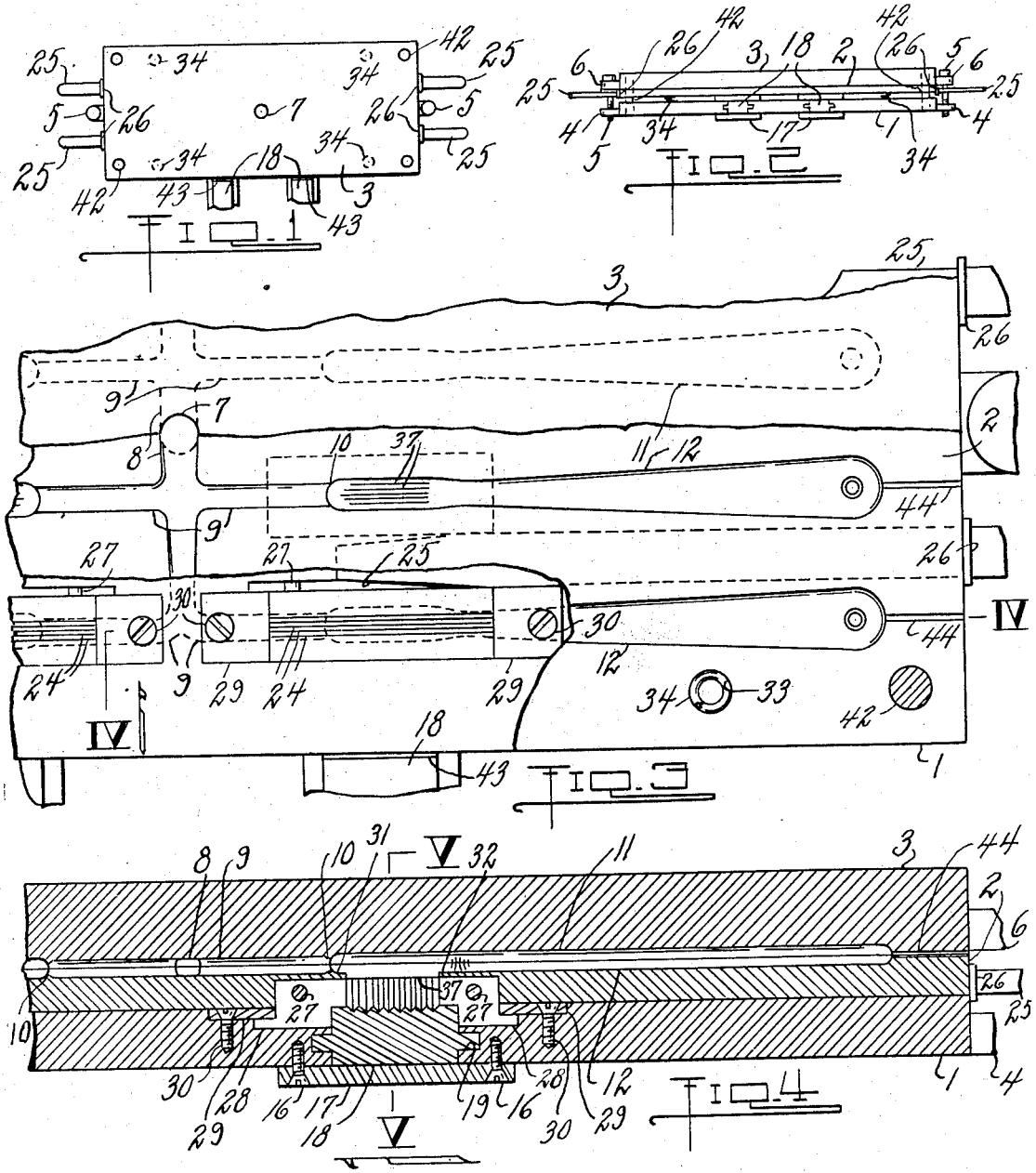
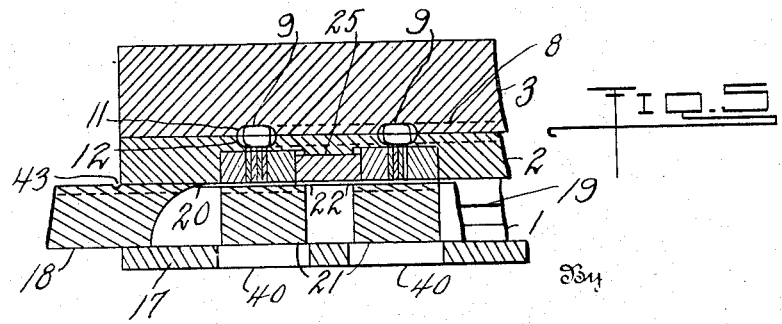
Hubert A. Myers
Inventor Aug. 15, 1944.   H. A. MYERS   2,355,744
BRUSH MANUFACTURE
Filed May 7, 1942   2 Sheets-Sheet 2
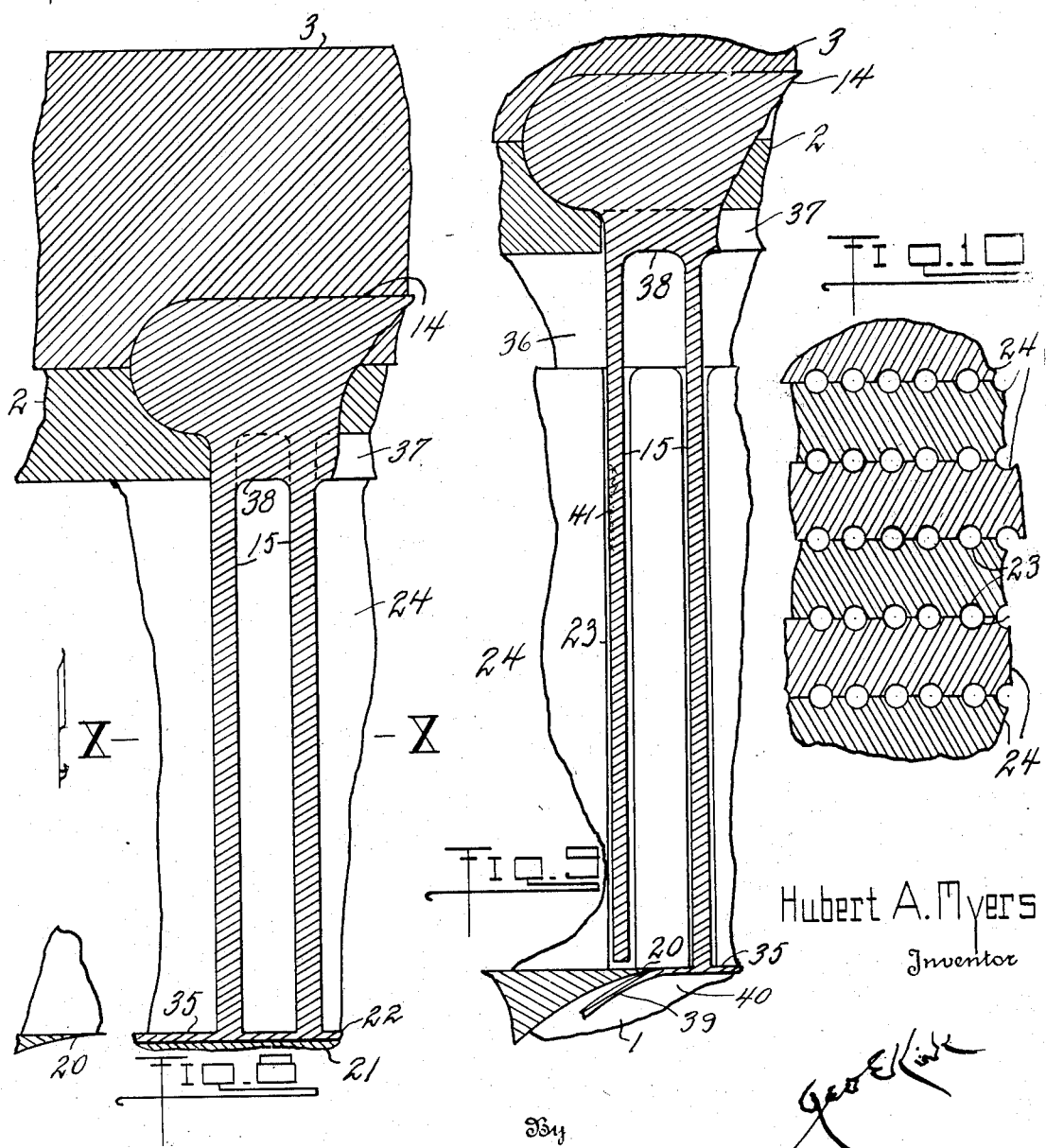

Patented Aug. 15, 1944

2,355,744

UNITED STATES PATENT OFFICE 2,355,744

BRUSH MANUFACTURE

Hubert A. Myers, Toledo, Ohio, assignor of one-half to Henry W. McKisson, Toledo, Ohio Application May 7, 1942, Serial No. 442,106

2 Claims. (Cl. 18—42)

This invention relates to specially formed article production.

This invention has utility in production, apparatus and practices, more particularly in homogeneous base and flexible hair-like fiber elements therefrom of brush type.

Referring to the drawings:

Fig. 1 is a plan view, with parts broken away, of features of the invention in a pressure mold or extrusion effecting type of die;

Fig. 2 is a side view in elevation of the die of Fig. 1;

Fig. 3 is an enlarged fragmentary plan, with parts broken away, to show the position of the article, herein shown as a die for a tooth brush;

Fig. 4 is a section on the line IV—IV, Fig. 3, showing the mold for a unit brush assembly;

Fig. 5 is a section on the line V—V, Fig. 4, showing the die or mold region in the vicinity of the bristle-forming section as assembled for the charge of plastic material;

Fig. 6 is a fragmentary view similar to Fig. 4 showing the distention position for the extruded bristle forming portion of the die as to the back;

Fig. 7 is a view similar to Fig. 5 showing the distention relation for the bristles as at the parting in Fig. 6;

Fig. 8 is a further enlarged fragment of the material in the mold before stripping for extension;

Fig. 9 is a view similar to Fig. 8 wherein the stripping for extension has occurred and the trimming of the fiber element is taking place; and Fig. 10 is a section on the line X—X, Fig. 8, showing the grouping for the fiber element ducts.

The general mold or die structure herein comprises a base element 1, an intermediate plate 2, and a top plate 3. Ears 4 on the plate 1 may, through the cooperation of clamping bolts 5 through ears 6 on the plate 3, hold the base plate 1 and the mold forming elements or dies 2, 3 (Fig. 3), in assembly upon the application of sprue pressure thereto. A predetermined quantity pressure plastic supply charge may be by way of intake port 7 from the sprue having trunk 8 and branches 9 therefrom extending past throats 10. This trunk 8 and branches 9 are complementary in the top mold section 3 and the intermediate section 2 with the throat 10 to article forming mold portion 11 in the top 3 and complemental portion 12 of a base cavity in the intermediate plate 2, thereby to form a brush handle 13 for a brush having back 14, from which bristles 15 (Fig. 6) extend.

Bolts 16 (Fig. 4) mount plate 17 for block 18 in guide way 19 as an overflow for extrusion region and including trimmer or cutting blade 20 and impeding block portions 21. These block portions 21 have clearance 22 relative to termini of ducts 23 formed by complementary groove portions of parallel die plates 24 (Fig. 10), pressure assembled by wedge block 25 having thrust limit collar 26 (Fig. 4). These parallel laterally grooved die blocks 24 are assembled on pins 27. Respectively, these plates 24 have bottom flanges 28 located under flanges 29 held by screws 30 with the base plate 1. These plates are accordingly located in appropriate position as to the overflow impeding blocks 21.

This region of the groove-carrying die plates 24 is spaced from the mold back portion of the complementary mold sections 11, 12, for the back 14 by overhanging wall portions 31, 32. In this assembly in recesses 33 (Fig. 3) in the base 1 are located compression helical springs 34. The injecting by a pressure flow of plastic material into the die or mold for such to be extruded simultaneously through the several orifices or cavities formed by the grooves 23 between the respective plates 24 has the excess flow at the clearance 22 establish continuity region 35 (Fig. 8) in this plastic. Accordingly, as the bolts 5 release the pressure holding between the sections 3, 4, which pressure holding is against the resistance of the springs 34, these springs 34 thrust the intermediate plate 2 and top 3 away from the base 1, desirably a determined distance, which may be gaged by backing off of the bolts 5, thereby to provide clearance 36 (Figs. 6, 7) between the intermediate plate 2 and the extrusion grooves 23 in their plates 24; these latter being held by the flanges 29 and the screws 30 with the plate 1. With this continuity region 35 of cross flow to anchor or to hold the terminal portions of these fibers 15 for the hair-like bristles, there is thus a tensioning or stretching of these respective bristles in the grooves 23 as to the brush back or assembly 14 therefor. This may be as much as 10 to 30 per cent of the length of these fibers. In practice, these fibers, say for a toilet article type of tooth brush, may be up to ⅝ inch long with the trimmer 20 to effect serrated outline for the free ends of these respective fibers 15. In cross section the diameter may be in the range of say .002 up to .004 inch in diameter.

The intermediate plate 2 as to its sections 31, 32, may have grooves 37 therebetween in register with the joints of the grooves 23, thereby to provide for the formation of web sections 38 in the respective rows for the grooves as a connection at the base between the respective bristles 15 in such row. As this tensioning action is effective, the block 18 may be shifted for its shearing of the serrations. To this end, the impeding block 21 passes away from the shield position as to the section 35 and the trimmer 20 in coming through removes the excess portion 35 by cutting 39 to pass by way of opening 40 clear of the die or mold (Figs. 5, 9).

In completing the withdrawal of the finished article from the mold, the further slacking off of the bolts 6 permits removal of the plate 2 from the top 3 and the respective completed units as a group may be withdrawn and fracture effected at the throats 10 in severing such completed plastic units.

In the operation hereunder, this plastic may be thermal responsive. The range of substances having the tension and fiber traits for resiliency and life in upkeep have been with nylons, methyl methacrylates, caseinates, acetates, and ureas. The dimension of the fiber may be varied according to the character of brush or article of which assembly is sought.

In furthering of refinement hereunder, the bristle forming portion of the die may have an almost impalpable insoluble powder of abrasive characteristics, such as rouge 41. The experience with this operation is that the surface area for the bristle 15 is increased, and such increase is due to imbedding or scratching with possible freeing of this abrasive from the fiber or bristle 15. This seems to enhance the cleansing property of the bristle in toilet use, for contributing to polish traits in the normal use of the tooth brush. The experience is that the brush as so treated seems to respond as though one has a toothpaste in use therewith.

To provide for aligned registry between the respective base intermediate plate 2 and top 3, interfitting dowels 42 (Fig. 3) cooperate therewith. In the positioning of the block 18 groove 43 (Fig. 5) as a marker is provided, thereby properly to position the impeding block 21. As provision against other than full functioning of the die there is of course latitude at the bristle termini due to the clearance 22. As against any gas accumulation in other portions, as the handle, there is terminal vent 44 (Fig. 3).

In carrying out the invention, there is simultaneously produced hereunder a completed homogenous article of sanitary characteristics, for there is in its integral structure absence of joint or impurity holding regions between the back and the bristles proper. Furthermore, these bristles are, in the smallness of cross-section, and as to the matter of length, of a flexibility to have the tip deflected as much as 45° away from the normal direction of projection, and, in the arch of flexing toward such, there is resiliency upon release for ready return, and the life in this flexing is one contributing to that of long use in practical and satisfactory working conditions, even as to aggressive functioning. The harshness of the article may be according to the material selected as well as the dimension adopted for the bristles, whether such be of uniform cross-section or tending, due to the distention, to depart from such uniformity. This extension treatment seems to be a promotion factor in toughness for greater resiliency.

In the manufacture hereunder as conducted for extruding, such may be effective for quite small diameters of bristles or filaments. The extruding action seems to compact or impart to the bristles a stiffness seemingly beyond that for a like cross-section distended or stretched bristle. The distention or stretching, especially as undertaken shortly after the extrusion, seems to effect a readjustment of the molecular relation beyond that of merely reducing the cross-section slightly. That is, the molecules of which the bristle is an assembly in this readjustment do not seem to have the compacted or stiffness relation but there is an increased degree of flexibility from this distention.

What is claimed and it is desired to secure by Letters Patent is:

1. The method of producing a brush base and bristles comprising injecting moldable material into a mold, having a base forming cavity and bristle forming cavities in communication with each other, the portion of the mold containing the bristle forming cavities being movable relative to the portion of the mold containing the base forming cavity, and the ends of said bristle forming cavities remote from said base forming cavity being open and provided with means for causing the moldable material issuing from said open ends to flow transversely of said cavities to anchor said material to ends of the bristle forming walls, to fill said mold and anchor said material thereto, moving the portion of the mold containing the bristle forming cavities relative to said portion containing the base forming cavity in a direction longitudinally of said bristle forming cavities to stretch the material of said bristles, trimming the ends of the bristles remote from the back to remove the anchoring material, and removing the finished brush from the mold.

2. A mold having a base forming cavity and bristle forming cavities in communication with each other, assembly means therebetween for releasing the bristle forming cavities portion of the mold for movement relatively to the base forming cavity portion of the mold, the end of the bristle forming cavities remote from the base forming cavity being open and provided with clearance way therebetween for transverse flow of material thereby to hold the bristle portions remote from the base for stretching the bristles longitudinally upon movement of the bristle cavities portion relatively to the base portion, trimming means movable transversely of the bristle extent at the clearance way for shearing the transverse flow from the bristles, and additional releasing means for the base portion of the mold for freeing the completed article therefrom.

HUBERT A. MYERS.